United States Patent
Barton et al.

(10) Patent No.: US 12,362,976 B2
(45) Date of Patent: Jul. 15, 2025

(54) GRANULAR GUARD INTERVAL TUNING

(71) Applicant: Cisco Technology, Inc., San Jose, CA (US)

(72) Inventors: Robert E. Barton, Richmond (CA); Matthew A. Silverman, Shaker Heights, OH (US); Jerome Henry, Pittsboro, NC (US); Pascal Thubert, Roquefort-les-Pins (FR)

(73) Assignee: Cisco Technology, Inc., San Jose, CA (US)

( * ) Notice: Subject to any disclaimer, the term of this patent is extended or adjusted under 35 U.S.C. 154(b) by 77 days.

(21) Appl. No.: 18/499,862

(22) Filed: Nov. 1, 2023

(65) Prior Publication Data

US 2024/0380646 A1 Nov. 14, 2024

Related U.S. Application Data

(60) Provisional application No. 63/502,088, filed on May 13, 2023.

(51) Int. Cl.
*H04L 27/26* (2006.01)

(52) U.S. Cl.
CPC .............................. *H04L 27/2605* (2013.01)

(58) Field of Classification Search
CPC . H04W 72/0453; H04W 52/42; H04W 88/08; H04W 56/005; H04W 84/12; H04W 72/23; H04W 24/02; H04W 52/241; H04B 7/0413; H04B 7/0443; H04B 7/10; H04B 7/0408; H04B 7/0697; H04B 7/0456; H04B 7/0854; H04B 7/0417; H04L 27/2607; H04L 5/0048; H04L 5/0053; H04L 5/0007; H04L 27/2657; H04L 27/2662; H04L 27/2602; H04L 27/2627

See application file for complete search history.

(56) References Cited

U.S. PATENT DOCUMENTS

| | | | |
|---|---|---|---|
| 10,461,975 B2 * | 10/2019 | Chen | ......................... H04L 5/22 |
| 11,652,672 B1 * | 5/2023 | Arool Emmanuel | ........................ H04L 25/0212 370/329 |
| 2018/0331868 A1 | 11/2018 | Zhang | |
| 2019/0007114 A1 | 1/2019 | Jaganathan et al. | |
| 2019/0020516 A1 | 1/2019 | Wang et al. | |
| 2019/0123946 A1 * | 4/2019 | Zhu | ..................... H04L 25/0222 |

(Continued)

FOREIGN PATENT DOCUMENTS

CN 105122755 B 4/2019

OTHER PUBLICATIONS

International Search Report and Written Opinion for International Application No. PCT/US2024/028998, mailed Sep. 2, 2024, 10 Pages.

*Primary Examiner* — Eva Y Puente
(74) *Attorney, Agent, or Firm* — Merchant & Gould P.C.

(57) ABSTRACT

Granular guard interval tuning may be provided. A delay profile for a plurality of sub-bands in a serving channel may be created. Then delay spread information from at least one calibration helper device for the plurality of sub-bands in the serving channel may be received. Next, a delay spread matrix based on the delay profile, the delay spread information, and a location of the calibration helper devices may be created. The delay spread matrix may then be used to determine optimal Guard Intervals (GIs).

20 Claims, 5 Drawing Sheets

(56) References Cited

U.S. PATENT DOCUMENTS

2020/0336349 A1    10/2020  Zhou et al.
2022/0337466 A1    10/2022  Barton et al.
2023/0198823 A1*   6/2023   Barton ................ H04L 27/2605
                                                                370/338

* cited by examiner

GRANULAR GUARD INTERVAL TUNING

RELATED APPLICATION TECHNICAL FIELD

Under provisions of 35 U.S.C. § 119 (e), Applicant claims the benefit of U.S. Provisional Application No. 63/502,088 filed May 13, 2023, which is incorporated herein by reference.

TECHNICAL FIELD

The present disclosure relates generally to granular guard interval tuning.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
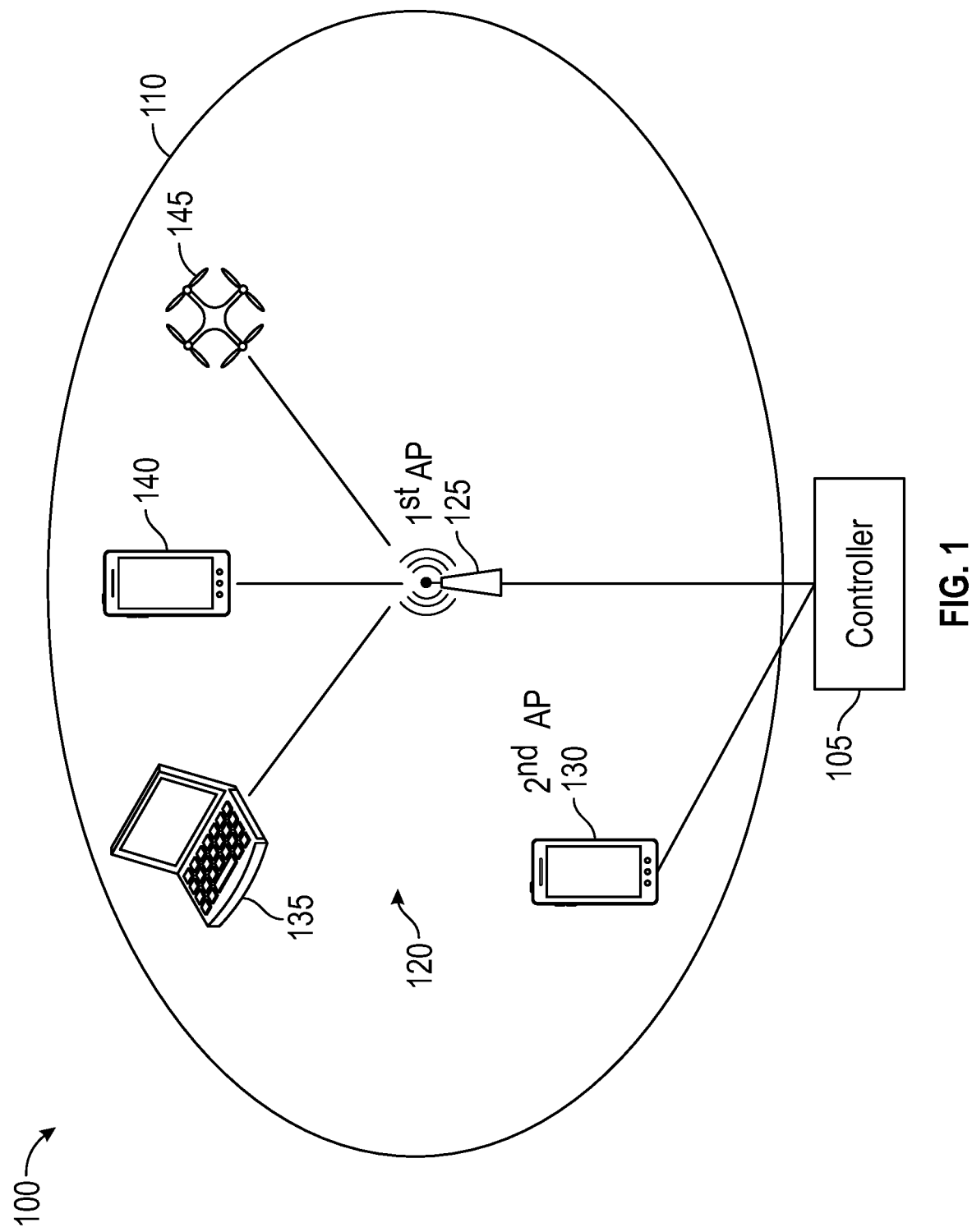
FIG. 1 is a block diagram of an operating environment for providing granular Guard Interval (GI) tuning.

Granular guard interval tuning may be provided. A delay profile for a plurality of sub-bands in a serving channel may be created. Then delay spread information from at least one calibration helper device for the plurality of sub-bands in the serving channel may be received. Next, a delay spread matrix based on the delay profile, the delay spread information, and a location of the calibration helper devices may be created. The delay spread matrix may then be used to determine optimal Guard Intervals (GIs).

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

One goal of Wi-Fi 8 may be to increase throughput through specific optimizations in a variety of environments. One area that may benefit from better throughput optimizations may be outdoor environments where Automated Guided Vehicles (AGVs) and fast-moving vehicles may be present and may leverage mechanisms such as Multi Link Operation (MLO) and Multi-Access Point Coordination (MAPC) for seamless handoff between APs.

One aspect of wireless may comprise intelligent adaptation of the Guard Interval (GI), which may be used between symbols to allow enough time for multi-path propagation from reflective surfaces to disappear, so as to avoid inter-symbol interference. In conventional wireless, 0.8 usec was used as a fixed GI. While this may work for indoor deployments where signal propagation may be short, in outdoor environments propagation and multi-path reflections may be longer, causing unexpected interference. Each environment may have its own delay spread characteristics, depending on the physical geometry of the site and materials that may be in use. In addition, moving APs (e.g., AGVs) may have continually changing delay spread characteristics.

Latter Wi-Fi versions may provide improvements with adjustable GI values that offer three options: 0.8 usec; 1.6 usec; and 3.2 usec. These extended guard interval duration values may allow for better protection against signal delay spread as it occurs in outdoor environments. Embodiments of the disclosure may determine optimal guard interval per sub-bands in a serving channel. A process consistent with embodiments of the disclosure may determine an optimal guard interval based on channel sounding or calibration with client devices.

FIG. 1 shows an operating environment 100 for providing granular guard interval tuning. As shown in FIG. 1, operating environment 100 may comprise a controller 105 and a coverage environment 110. Coverage environment 110 may comprise, but is not limited to, a Wireless Local Area Network (WLAN) comprising a plurality of stations 120. The plurality of stations 120 may comprise a plurality of Access Points (APs) and a plurality of client devices. At any given time, any one of the plurality of stations 120 may comprise an Initiating Station (ISTA) or a Responding Station (RSTA). The plurality of APs may provide wireless network access (e.g., access to the WLAN) for the plurality of client devices. The plurality of APs may comprise a first AP 125 and a second AP 130. Each of the plurality of APs may be compatible with specification standards such as, but not limited to, the IEEE 802.11 specification standard for example. Coverage environment 110 may comprise, but is not limited to, an outdoor wireless environment, such as a mesh (e.g., a Wi-Fi mesh). Embodiments of the disclosure may also apply to indoor wireless environments and non-mesh environments.

Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, an Augmented Reality (AR)/Virtual Reality (VR) device, an Automated Transfer Vehicle (ATV), a drone, an Unmanned Aerial Vehicle (UAV), an Automated Guided Vehicles (AGVs), or other similar microcomputer-based device. In the example shown in FIG. 1, the plurality of client devices may comprise a first client device 135 (e.g., a laptop computer), a second client device 140 (e.g., a smart phone), and a third client device 145 (e.g., a drone).

Controller 105 may comprise a Wireless Local Area Network controller (WLC) and may provision and control operating environment 100 (e.g., the WLAN). Controller 105 may allow the plurality of client devices to join operating environment 100. In some embodiments of the disclosure, controller 105 may be implemented by a Digital Network Architecture Center (DNAC) controller (i.e., a Software-Defined Network (SDN) controller) that may configure information for operating environment 100 in order to provide granular guard interval tuning consistent with embodiments of the disclosure.

The elements described above of operating environment 100 (e.g., controller 105, first AP 125, second AP 130, first client device 135, second client device 140, and third client device 145) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
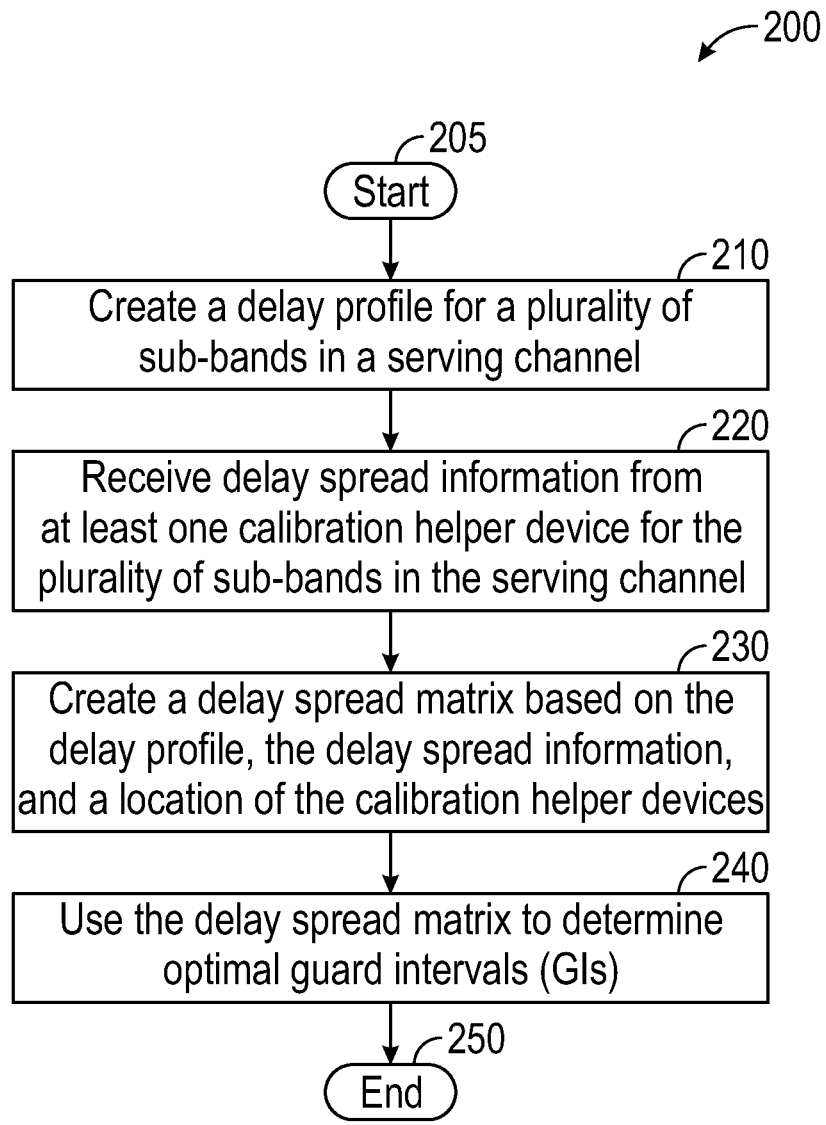
FIG. 2 is a flow chart of a method for providing granular GI tuning.

FIG. 2 is a flow chart setting forth the general stages involved in a method 200 consistent with embodiments of the disclosure for providing granular guard interval tuning. Method 200 may be implemented using a computing device 400 (e.g., first AP 125) as described in more detail above with respect to FIG. 1. Ways to implement the stages of method 200 will be described in greater detail below.

Figure 3:
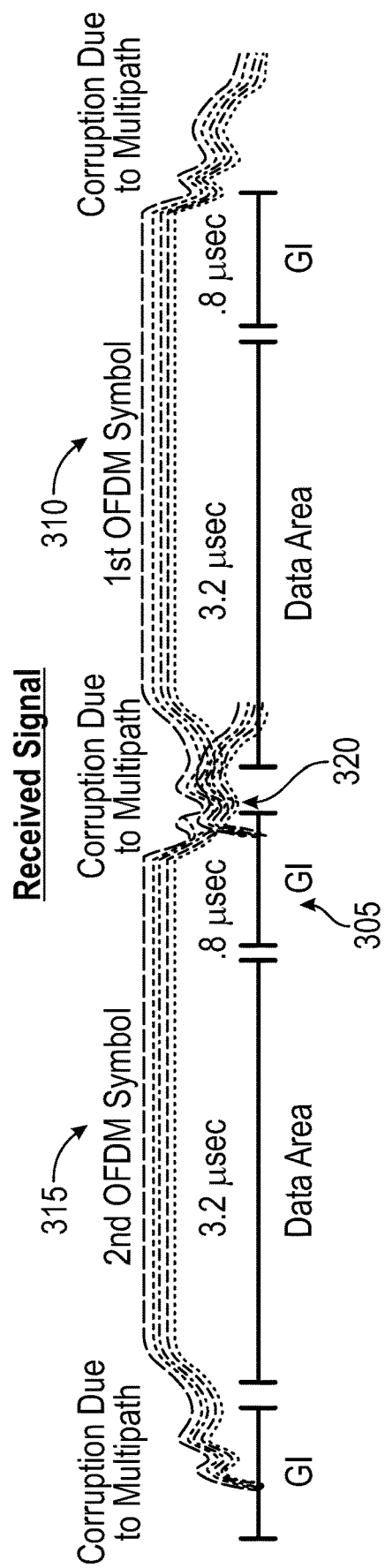
FIG. 3 FIG. 3 is a diagram illustrating a GI.

FIG. 3 is a diagram illustrating a GI 305. As shown in FIG. 3, GI 305 may be in place to protect successive symbols (e.g., a first symbol 310 and a second symbol 315) from interfering with each other. However, there may be a trade-off in performance verses a GI time that may be selected. For example, a 3.2 μs GI may result in longer time between symbols and protect against reflections 320 at longer range, however, the efficiency of the radio may only function at 88.9%. With a GI of 0.8 μs, the symbol transmission may be more aggressive, leading to improved efficiency of, for example, 95% (e.g., a 6.9% improvement), however, it may cause symbol interference issues in certain environments.

Between a plurality (e.g., three) of available GIs (e.g., 0.8 μs, 1.6 μs, and 3.2 μs), performance may vary significantly, however, there may be no reliable way to automatically tune or adjust the GI based on the physical environment. GI tuning may comprise a manual process, for example, engineers may either tune to a safer (e.g., 3.2 μs) GI, perhaps unnecessarily limiting the network performance, or keep the default (e.g., 0.8 μs), and potentially cause the network to suffer from performance degradation (e.g., especially for mesh networks). Accordingly, embodiments of the disclosure may provide processes to determine an optimal guard interval based on channel sounding or calibration with client devices as described in greater detail below.

Method 200 may begin at starting block 205 and proceed to stage 210 where computing device 400 may create a delay profile for a plurality of sub-bands in a serving channel. For example, the GI may be a repeating of the beginning of a symbol that extends the duration of each symbol to prevent interference due to reflections of the preceding signal. In closed areas, reflections may come fast, allowing the AP (e.g., first AP 125) to have a short GI (with high throughput), whereas in wide open spaces with fewer and farther reflective surfaces, the delay spread (the last reflection that may interfere with the original signal) may be longer, thus it may require a longer GI for efficient operations, but resulting in a lower transmission rate.

For the AP (e.g., first AP 125) to determine an optimal GI for a given environment, it may perform a calibration phase for the serving channel. The AP may do this by sending sounding frames for the sub-bands (i.e., the sub-channel segments) the AP is serving. For each sub-band (e.g., 20 MHz blocks), the AP may examine the maximum delay spread encountered on each block. This may vary more substantially over wider channels. For example, 160 MHz or 320 MHz channels may have a varying delay spread, depending on the environment (e.g., indoor versus outdoor).

The AP, for example, may look at individual 20 MHz sub-bands and performs an Inverse Fast Fourier Transform (IFFT) on those individually (e.g., based on individual sounding of those sub-bands or by doing an IFFT on each 20 MHz sub-band from the full 160 or 320 MHz sounding). The AP may provide a delay profile for each sub-band.

From stage 210, where computing device 400 creates the delay profile for the plurality of sub-bands in the serving channel, method 200 may advance to stage 220 where computing device 400 may receive delay spread information from at least one calibration helper device for the plurality of sub-bands in the serving channel. For example, in this calibration phase, the AP (e.g., first AP 125) may communicate with other nearby wireless (e.g., Wi-Fi) devices that may act as calibration helpers. In one embodiment, the AP may use Neighbor Discovery Protocol (NDP) messages (e.g., AP-to-AP discovery messages) to exchange with other APs (e.g., second AP 130) in range, using this protocol to share delay spread information between APs. In another embodiment, the AP may select a farthest client device (e.g., a client device with a lowest Modulation Coding Scheme (MCS)/Received Signal Strength Indicator (RSSI)). The AP may ask the remote client device to perform a delay spread calibration. After accepting, the remote client device may receive the AP's signal, compute the delay spread, and report it back to the originating AP. In another embodiment, Wi-Fi sensors may be used.

In yet another embodiment, a calibration helper device may comprise an autonomous vehicle or a drone that moves throughout the environment to assist with the GI calibration. As the calibration helper device moves, the calibrating AP may take note of the physical location, adding this information to the delay spread matrix.

The calibration helper device may measure the delay spread on sub-bands (i.e., sub-channel segments) of the serving channel and report their results back to the calibrating AP. For example, sub-bands of the full serving channel may be 20 MHz of a 160 MHz channel, or any other size, with flexible granularity to find how the delay spread responds across the entire serving channel, rather than assuming a fixed value for the entire serving channel.

Thus, during the calibration phase, the AP may cycle through all sub-bands and all widths of the assigned serving channel (e.g., 20, 40, 80, 160 MHz transmissions). Thus, embodiments of the disclosure may augment the delay spread matrix to include the delay spread characteristics across an entire serving channel, with some granularity.

Once computing device 400 receives the delay spread information from the at least one calibration helper device for the plurality of sub-bands in the serving channel in stage 220, method 200 may continue to stage 230 where computing device 400 may create a delay spread matrix based on the delay profile, the delay spread information, and a location of the calibration helper devices. For example, the calibrating AP (e.g., first AP 125) may build a min/max delay spread matrix based on these sub-band segments. This min/max delay spread matrix may comprise an n-dimensional tensor depicting the min/max delay spread for each client device over each frequency sub-band. Based on the measured delay spread in the matrix, the AP may determine an optimum (e.g., minimal) GI when it is transmitting set of frequencies in the Basic Service Set (BSS). This matrix may set boundary values (e.g., min/max).

After computing device 400 creates the delay spread matrix based on the delay profile, the delay spread information, and a location of the calibration helper devices in stage 230, method 200 may proceed to stage 240 where computing device 400 may use the delay spread matrix to determine optimal GIs. For example, once the AP (e.g., first AP 125) has calculated the optimal delay spread, it may communicate this back to the associated client devices in a trigger frame so they may all adjust their GI to the optimal level. This process may be repeated at regular intervals, especially if the network is situated in a dynamic environment.

Accordingly, the AP may dynamically choose the best possible GI based on their frequency sub-blocks that may be used for communications with the client devices and then to report this information back to associated AP. The optimal GI may correspond to the sub-band segments that were measured during calibration, and so may be different on a per-transmission basis, depending on which frequency sub-bands are used. Once computing device 400 uses the delay spread matrix to determine the optimal GIs in stage 240, method 200 may then end at stage 250.

Consistent with embodiments of the disclosure, the delay spread as it affects a client device may also depend on where the client is physically located (e.g., a client device that is closer to a highly reflective surface versus one that is not may have different delay spread characteristics). Thus, embodiments of the disclosure may allow sounding frames to be exchanged with target client devices in multiple modes and may allow the feedback matrices from these clients to include delay spread measurements. Embodiments of the disclosure may also allow the AP to measure the delay spread on upstream frames.

Next, as the AP prepares a frame for transmission, it may adapt the GI to the optimal value based on the target receiver(s). The GI may be a single value for the entire transmission. Therefore, when the target is a group of client devices with transmissions over multiple sub-band segments (from the calibration phase), the AP may select from the delay spread matrix the most conservative value for the group and transmits the entire frame at that value.

For upstream traffic, the AP trigger frame may include a target GI value, thus causing all client devices in an uplink transmission to dynamically adapt their GI to the best common value for that transmission. For Single User (SU) transmissions, embodiments of the disclosure may allow the AP to send a GI update value Information Element (IE) in a management frame, thus allowing individual client devices to receive individual optimal GI values that may be updated over time. In one embodiment, the GI may be valid until the next sounding exchange that includes delay spread information. In another embodiment, the AP may include a GI validity duration beyond which, and in the case the AP has not updated the client device with a new GI value, the client device may revert to the bound value defined above and that is expressed in the AP beacons, until the AP provides a better GI value indication.

In another embodiment, if the AP is mobile (e.g., an AP on an AGV, or a virtual AP on a mobile device), a learning mechanism may be created. The entire system may learn the delay spread matrix that may be held on controller 115. When an AP is in motion, it may reference the centralized delay spread matrix from controller 115 to determine what the optimal GI may be at any given location, and it may use this accordingly.

Figure 4:
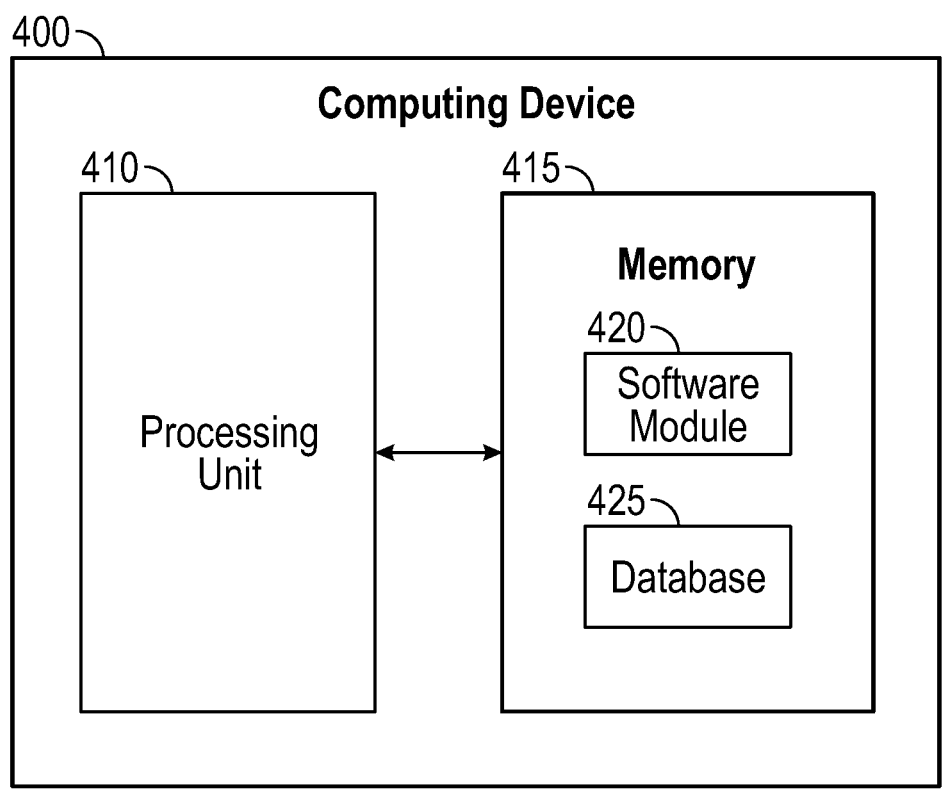
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing granular guard interval tuning as described above with respect to FIG. 2. Computing device 400, for example, may provide an operating environment for controller 105, first AP 125, second AP 130, first client device 135, second client device 140, or third client device 145. Controller 105, first AP 125, second AP 130, first client device 135, second client device 140, and third client device 145 may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Figure 5:
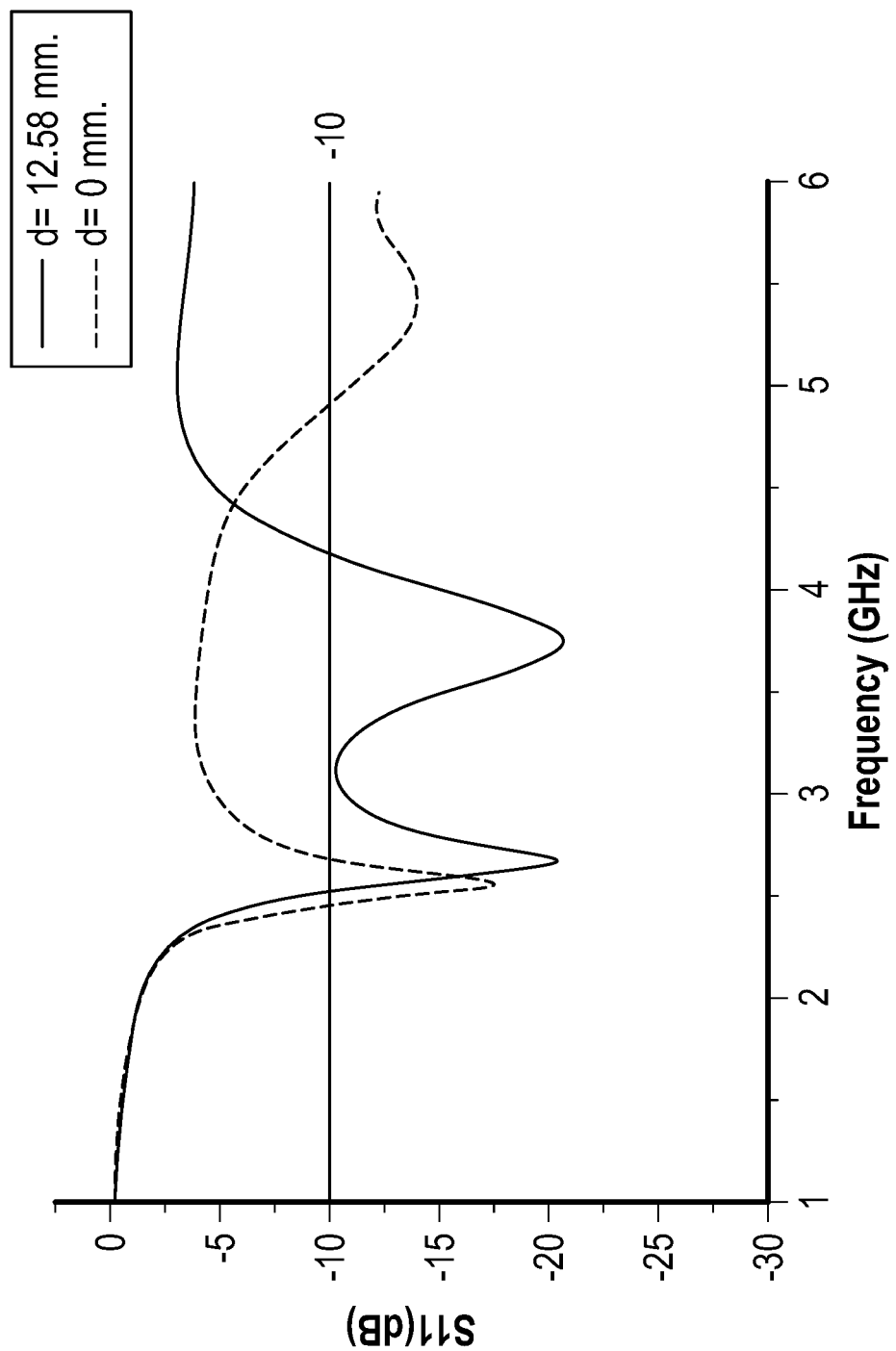
FIG. 5 is a diagram illustrating delay spread.

As illustrated by FIG. 5, from the point of view of a client device, delay spread may comprise the time measured from the first signal received to the final reflected signal above a Signal-to-Noise (SNR) threshold. Thus, if there are objects that reflect back the incident wave above a minimal return loss (i.e., S11), it may be measured as a duplicate (i.e., interfering) copy of the initial signal, and may lengthen the delay spread (thus reducing performance of the radio).

The reflection coefficient (represented as Gamma-"Γ", and by extension, the Radio Frequency (RF) Return Loss (i.e., S11)), may be a function of frequency. For example, consider this frequency versus S11 (return loss) in FIG. 5 that demonstrates how the return loss (S11), and by extension, the reflective coefficient Γ vary with frequency (for a given reflective surface type). For example, a wide channel (e.g., a 320 MHz channel, or even potentially future wider ones in the 60 GHz band) may have greatly differing values of Γ as frequencies change over this band. This may mean there may be a varying delay spread across a single wireless channel. This property substantiates why varying GI values depending on which sub frequencies are used is a helpful optimization.

Γ and S11 values may vary with frequency (and material type). For example, certain frequencies or materials with lower S11s value may attenuate more than others and may not be heard as a reflection by the client device, thus decreasing the delay spread. This may mean that the AP, as it learns this profile, may adapt its GI for each client device based on both its physical location as well as the frequency within the channel.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   creating, by a computing device, a delay profile for a plurality of sub-bands in a serving channel;
   receiving delay spread information from at least one calibration helper device for the plurality of sub-bands in the serving channel;
   creating a delay spread matrix based on the delay profile, the delay spread information, and a location of the calibration helper devices; and using the delay spread matrix to determine optimal Guard Intervals (GIs).

2. The method of claim 1, further comprising providing the GIs to client devices.

3. The method of claim 1, wherein creating the delay profile for the plurality of sub-bands in the serving channel comprises performing an Inverse Fast Fourier Transform (IFFT) on each of the plurality of sub-bands.

4. The method of claim 1, wherein the at least one calibration helper device comprises a client device.

5. The method of claim 1, wherein the at least one calibration helper device comprises an Access Point (AP).

6. The method of claim 1, wherein the at least one calibration helper device comprises one of an autonomous vehicle and a drone.

7. The method of claim 1, wherein the computing device is an Access Point (AP).

8. The method of claim 1, further comprising repeating the method periodically.

9. A system comprising:
   a memory storage; and
   a processing unit coupled to the memory storage, wherein the processing unit is operative to:
      create a delay profile for a plurality of sub-bands in a serving channel;
      receive delay spread information from at least one calibration helper device for the plurality of sub-bands in the serving channel;
      create a delay spread matrix based on the delay profile, the delay spread information, and a location of the calibration helper devices; and
      use the delay spread matrix to determine optimal Guard Intervals (GIs).

10. The system of claim 9, further wherein the processing unit is further operative to provide the GIs to client devices.

11. The system of claim 9, wherein the processing unit being operative to create the delay profile for the plurality of sub-bands in the serving channel comprises the processing unit being operative to perform an Inverse Fast Fourier Transform (IFFT) on each of the plurality of sub-bands.

12. The system of claim 9, wherein the at least one calibration helper device comprises a client device.

13. The system of claim 9, wherein the at least one calibration helper device comprises an Access Point (AP).

14. The system of claim 9, wherein the at least one calibration helper device comprises one of an autonomous vehicle and a drone.

15. A non-transitory computer-readable medium that stores a set of instructions which when executed perform a method executed by the set of instructions comprising:
   creating, by a computing device, a delay profile for a plurality of sub-bands in a serving channel;
   receiving delay spread information from at least one calibration helper device for the plurality of sub-bands in the serving channel;
   creating a delay spread matrix based on the delay profile, the delay spread information, and a location of the calibration helper devices; and
   using the delay spread matrix to determine optimal Guard Intervals (GIs).

16. The non-transitory computer-readable medium of claim 15, further comprising providing the GIs to client devices.

17. The non-transitory computer-readable medium of claim 15, wherein creating the delay profile for the plurality of sub-bands in the serving channel comprises performing an Inverse Fast Fourier Transform (IFFT) on each of the plurality of sub-bands.

18. The non-transitory computer-readable medium of claim 15, wherein the at least one calibration helper device comprises a client device.

19. The non-transitory computer-readable medium of claim 15, wherein the at least one calibration helper device comprises an Access Point (AP).

20. The non-transitory computer-readable medium of claim 15, wherein the at least one calibration helper device comprises one of an autonomous vehicle and a drone.

* * * * *